US009608755B2

(12) United States Patent
Moynihan (10) Patent No.: US 9,608,755 B2
(45) Date of Patent: Mar. 28, 2017

(54) NETWORK ELEMENT CLOCK SYNCHRONIZATION SYSTEMS AND METHODS USING OPTICAL TRANSPORT NETWORK DELAY MEASUREMENT

(75) Inventor: Jeffrey Scott Moynihan, Cumming, GA (US)

(73) Assignee: Ciena Corporation, Hanover, MD (US)

( * ) Notice: Subject to any disclaimer, the term of this patent is extended or adjusted under 35 U.S.C. 154(b) by 1037 days.

(21) Appl. No.: 13/032,790

(22) Filed: Feb. 23, 2011

(65) Prior Publication Data
US 2012/0213508 A1   Aug. 23, 2012

(51) Int. Cl.
| | | |
|---|---|---|
| *H04J 3/16* | (2006.01) | |
| *H04J 3/06* | (2006.01) | |
| *H04L 27/26* | (2006.01) | |
| *H04L 25/24* | (2006.01) | |
| *H04L 9/12* | (2006.01) | |
| *H04L 7/00* | (2006.01) | |

(52) U.S. Cl.
CPC .......... *H04J 3/1658* (2013.01); *H04J 3/0682* (2013.01); *H04L 7/0054* (2013.01); *H04L 9/12* (2013.01); *H04L 25/247* (2013.01); *H04L 27/2653* (2013.01)

(58) Field of Classification Search
CPC ....... H04J 3/1658; H04J 3/065; H04W 56/00; H04L 7/0054; H04L 27/2653; H04L 25/247; H04L 9/12
USPC ............................ 370/509, 241.1; 398/25, 72
See application file for complete search history.

(56) References Cited

U.S. PATENT DOCUMENTS

| | | | | |
|---|---|---|---|---|
| 7,583,897 | B2 * | 9/2009 | Farmer et al. | 398/72 |
| 7,835,290 | B2 * | 11/2010 | Song et al. | 370/241.1 |
| 2002/0039362 | A1 * | 4/2002 | Fisher et al. | 370/387 |
| 2004/0213238 | A1 * | 10/2004 | Peled | 370/394 |
| 2008/0095535 | A1 * | 4/2008 | Zou | 398/58 |

(Continued)

OTHER PUBLICATIONS

International Telecommunication Union; ITU-T Telecommunication Standardization Sector of ITU-G.709/Y.1331 (Dec. 2009); Interfaces for the Optical Transport Netowrk (OTN)/, Available online at: http://www.itu.int/rec/T-REC-G.709/e.

(Continued)

*Primary Examiner* — Alpus H Hsu
*Assistant Examiner* — Anthony Luo
(74) *Attorney, Agent, or Firm* — Clements Bernard Walker PLLC; Christopher L. Bernard; Lawrence A. Baratta, Jr.

(57) ABSTRACT

The present disclosure provides Network Element (NE) clock synchronization using Optical Transport Network (OTN) delay measurement systems and methods such as described in ITU-T G.709 (December 2009) "Interfaces for the Optical Transport Network (OTN)" and G.798 (October 2010) "Characteristics of optical transport network hierarchy equipment functional blocks". OTN provides a Delay Measurement (DM) function to measure fiber path latency between two network elements to within microsecond accuracy. The convergence of packet switching and OTN transport into the same network element allows the sharing of this information between the two applications. The OTN delay measurement value can be used to synchronize two network element clocks to within microsecond accuracy without the need for a costly GPS synchronization solution or reduced accuracy NTP solutions.

20 Claims, 4 Drawing Sheets

(56) References Cited

U.S. PATENT DOCUMENTS

2009/0067844 A1* 3/2009 Archambault ..... H04B 10/2513
                                                    398/81
2009/0317073 A1* 12/2009 Hotchkiss et al. ................. 398/1
2010/0085990 A1*  4/2010 Belhadj et al. ............... 370/517
2010/0309934 A1* 12/2010 Umayabashi et al. ........ 370/509
2011/0170860 A1*  7/2011 Smith et al. .................... 398/25
2012/0287948 A1* 11/2012 Ruffini et al. ................. 370/503

OTHER PUBLICATIONS

International Telecommunication Union; ITU-T Telecommunication Standardization Sector of ITU-G.798 (Dec. 2006); "Characteristics of optical transport network hierarchy equipment functional blocks", Available online at: http://www.itu.int/rec/T-REC-G.798/e.

* cited by examiner

|   | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | FAS ||||||| MFAS | SM ||| GCC0 ||| RES | RES | JC |
| 2 | RES ||| T.ACT | TCM6 ||| TCM5 ||| TCM4 ||| FTFL | RES | JC |
| 3 | TCM3 ||| TCM2 ||| TCM1 ||| PM ||| EXP || RES | JC |
| 4 | GCC1 || GCC2 || APS/PCC |||| RES |||||| PSI | NJO |

NETWORK ELEMENT CLOCK SYNCHRONIZATION SYSTEMS AND METHODS USING OPTICAL TRANSPORT NETWORK DELAY MEASUREMENT

FIELD OF THE INVENTION

The present invention relates generally to networking systems and methods. More particularly, the present invention relates to Network Element (NE) clock synchronization systems and methods using Optical Transport Network (OTN) delay measurements such as described in ITU-T G.709 and G.798.

BACKGROUND OF THE INVENTION

Delay measurement in packet networks is a highly desirable feature for network operators. Synchronization of two network element clocks allows the system to perform one-way packet delay measurements, jitter measurements, and throughput measurements. The accuracy of this synchronization directly affects the accuracy of the measurements. These measurements need microsecond accuracy, requiring the network element clocks to also have microsecond synchronization accuracy. Currently, the only way to guarantee microsecond accuracy is to use Global Positioning Satellite (GPS) synchronization at both network elements. The GPS solution requires each network element to have a GPS receiver available and to support GPS or external synchronization input. This results in added cost and complexity to the network and the network elements. The Network Timing Protocol (NTP) is also available to synchronize network element clocks; however this method only provides millisecond accuracy which is unsuitable for packet measurements. The NTP protocol is limited by the unknown amount of latency between the network elements. This latency can be affected by the network element CPU, packet processor, physical interface, transport interface, and the fiber path between the network elements. Of these, the fiber path latency is the greatest contributing factor to the unknown latency. The other latency contributing factors can be mitigated by implementation, or accurately estimated and accounted for in the synchronization process.

BRIEF SUMMARY OF THE INVENTION

In an exemplary embodiment, a method includes utilizing Optical Transport Network to perform a delay measurement between a first network element and a second network element; transmitting a time-stamped packet from the first network element to the second network element; receiving the time-stamped packet at the second network element; recovering a time stamp from the time-stamped packet; and utilizing the time stamp and the delay measurement to adjust the second network element. The method may further include utilizing the time stamp and the delay measurement to adjust a clock of the second network element to synchronize with a clock of the first network element. The method may further include operating a packet service over Optical Transport Network between the first network element and the second network element. The method may further include interconnecting the first network element and the second network element with a plurality of intermediate network elements therebetween and operating a packet service over Optical Transport Network between the first network element and the second network element. Optionally, the method may further include performing the delay measurement through Path Monitoring (PM) bytes in Optical Transport Network. Alternatively, the method may further include performing the delay measurement through one or more Tandem Connection Monitoring (TCM) bytes in Optical Transport Network. The method may further include synchronizing each of the plurality of intermediate network elements with the first network element. The synchronizing may include for each of the plurality of intermediate network elements: utilizing Optical Transport Network to perform a delay measurement between the first network element and one of the plurality of intermediate network elements; transmitting a time-stamped packet from the first network element to the one of the plurality of intermediate network elements; receiving the time-stamped packet at the one of the plurality of intermediate network elements; recovering a time stamp from the time-stamped packet; and utilizing the time stamp and the delay measurement to adjust the one of the plurality of intermediate network elements. The method may further include performing the delay measurement in Optical Transport Network compliant to G.709 and G.798. The first network element and the second network element do not utilize Global Positioning Satellite or Network Time Protocol for synchronization therebetween.

In another exemplary embodiment, a network includes a plurality of interconnected network elements; a packet service operating over Optical Transport Network between a first network element and a second network element; and an algorithm configured to synchronize a clock associated with the second network element with a clock associated with the first network element based upon a delay measurement over Optical Transport Network and a delay measurement over the packet service. The algorithm includes utilizing an Optical Transport Network delay measurement between the first network element and the second network element followed by a packet delay measurement between the first network element and the second network element. The algorithm may include the second network element adjusting the clock associated with the second network element based upon the delay measurement over Optical Transport Network and the packet delay measurement. The first network element and the second network element may be interconnected via a plurality of intermediate network elements. Optionally, the algorithm utilizes Path Monitoring (PM) bytes in Optical Transport Network for the delay measurement over Optical Transport Network. Alternatively, the algorithm utilizes one or more Tandem Connection Monitoring (TCM) bytes in Optical Transport Network for the delay measurement over Optical Transport Network.

In yet another exemplary embodiment, a network element includes a plurality of ports; a switch interconnecting the plurality of ports; a clock; and an algorithm configured to synchronize the clock with an external network element based upon an Optical Transport Network delay measurement and a packet delay measurement between one of the plurality of ports and the external network element. The plurality of ports utilize Optical Transport Network compliant to G.709 and G.798, and wherein the one of the plurality of ports includes a packet service with the external network element.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention relates to Network Element (NE) clock synchronization using Optical Transport Network (OTN) delay measurement systems and methods such as described in ITU-T G.709 (December 2009) "Interfaces for the Optical Transport Network (OTN)" and G.798 (October 2010) "Characteristics of optical transport network hierarchy equipment functional blocks". OTN provides a Delay Measurement (DM) function to measure fiber path latency between two network elements to within microsecond accuracy. The convergence of packet switching and OTN transport into the same network element allows the sharing of this information between the two applications. The OTN delay measurement value can be used to synchronize two network element clocks to within microsecond accuracy without the need for a costly GPS synchronization solution or reduced accuracy NTP solutions.

Figure 1:
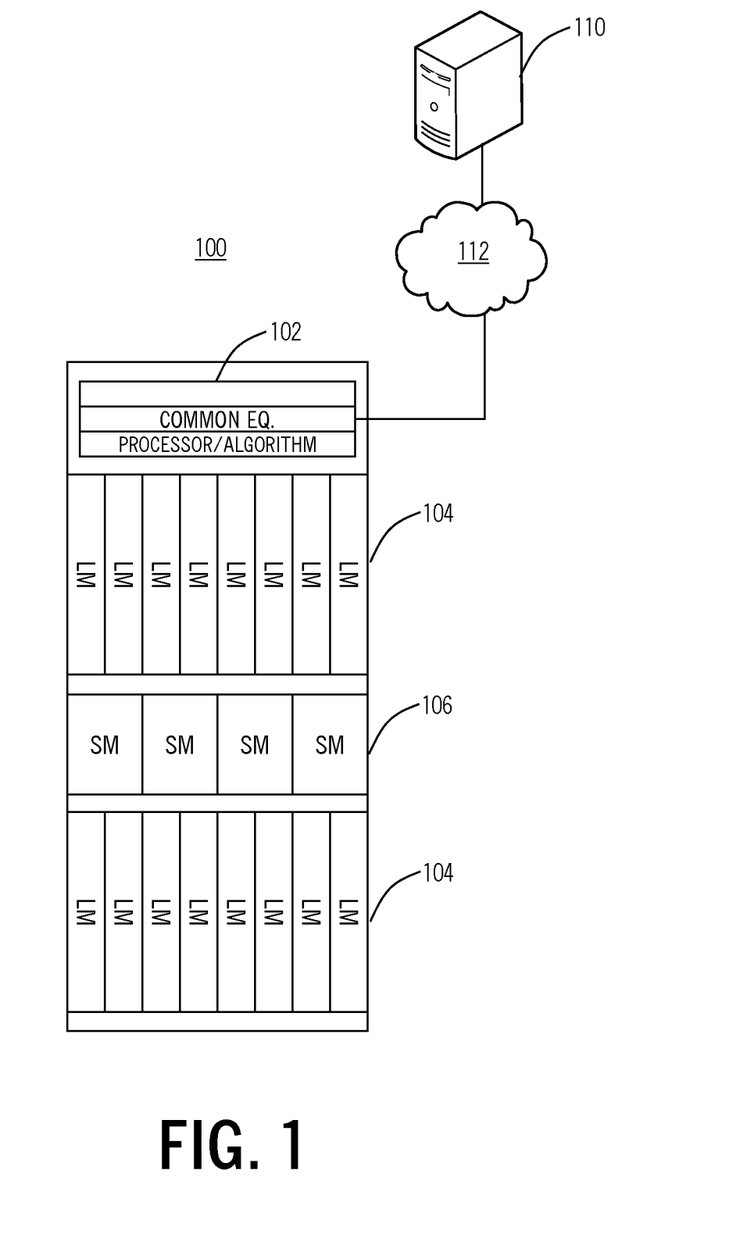
FIG. 1 is a block diagram of an exemplary network element configured to synchronize with another network element based upon an OTN delay measurement.

Referring to FIG. 1, in an exemplary embodiment, a block diagram illustrates an exemplary network element 100 configured to synchronize with another network element 100 based upon an OTN delay measurement. In an exemplary embodiment, the network element 100 may be network element (NE) that may consolidate the functionality of a multi-service provisioning platform (MSPP), digital cross connect (DCS), Ethernet and Optical Transport Network (OTN) switch, dense wave division multiplexed (DWDM) platform, etc. into a single, high-capacity intelligent switching system providing layer 0, 1, and 2 consolidation. In an exemplary embodiment, the network element 100 includes common equipment 102, line modules (LM) 104, and switch modules (SM) 106. The common equipment 102 may include power, a control module, operations, administration, maintenance, and provisioning (OAM&P) access, and the like. For example, the common equipment 102 may connect to a management system 110 through a data communication network 112. The management system 110 may include a network management system (NMS), element management system (EMS), craft interface (CI), or the like. Further, the common equipment 102 may include processing components configured to operate OTN and packet services over the line modules 104 and the switch modules 106. For example, the common equipment 102 may include a network element clock. This clock may be utilized for packet delay, packet jitter, and packet throughput measurements associated with the network element 100. In various exemplary embodiments, the present invention provides systems and methods to synchronize the network element clocks between two network elements 100 using OTN Delay Measurements and packet delay measurements therebetween.

The line modules 104 may be communicatively coupled to the switch modules 106, such as through a backplane, mid-plane, or the like. The line modules 104 are configured to provide ingress and egress to the switch modules 106, and are configured to provide interfaces for the services described herein. In an exemplary embodiment, the line modules 104 may form ingress and egress switches with the switch modules 106 as center stage switches for a three-stage switch, e.g. three stage Close switch. The line modules 104 may include optical transceivers, such as, for example, 2.5 Gb/s (OC-48/STM-1, OTU1, ODU1), 10 Gb/s (OC-192/STM-64, OTU2, ODU2), 40 Gb/s (OC-768/STM-256, OTU3, ODU4), GbE, 10 GbE, etc. Further, the line modules 104 may include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules 104 may include DWDM interfaces, short reach interfaces, and the like, and may connect to other line modules 104 on remote network elements 100, switches, end clients, and the like. From a logical perspective, the line modules 104 provide ingress and egress ports to the node 1000, and each line module 104 may include one or more physical ports.

In an exemplary embodiment, one variety of line modules 104 may include OTN services with the line module configured to support <2.7G, 10G, 40G and 100G OTN services with Field Programmable Gate Array (FPGA)-based framers configured to adapt to evolving OTN standards. In another exemplary embodiment, another variety of line modules 104 may include packet services with the line module configured to support 1G, 10G, 40G, & 100G packet services and a Carrier Ethernet feature set such as IEEE 802.1ag/Y.1731 based OAM and a Virtual Switch Architecture. Further, the packet services feature set may include Multiprotocol Label Switching Transport Profile (MPLS-TP) for Connection Oriented Ethernet (COE) Transport (LER, LSR). In still yet another exemplary embodiment, another variety of line modules 104 may include a hybrid services line module capable of supporting both 10G, 40G, & 100G OTN and packet services providing line side aggregation of OTN and Packet client services onto "shared" wavelength.

The switch modules 106 are configured to switch services between the line modules 104. For example, the switch modules 106 may provide wavelength granularity, SONET/SDH granularity such as Synchronous Transport Signal-1 (STS-1), Synchronous Transport Module level 1 (STM-1), Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical channel Payload Virtual Containers (OPVCs), ODUflex, etc.; Ethernet granularity including SPBM support; and the like. Specifically, the switch modules 1006 may include both Time Division Multiplexed (TDM) and packet switching engines. The switch modules 1006 may include redundancy as well, such as 1:1, 1:N, etc. Collectively, the line modules 104 and the switch modules 106 may provide connections between network elements, etc. It should be appreciated that FIG. 1 depicts the network element 100 in an oversimplified manner, and a practical embodiment may include additional components and suitably configured processing logic to support known or conventional operating features that are not described in detail herein. Furthermore, it should be appreciated that the components 102, 104, 106 of the network element 100 described herein are presented for illustration purposes of an exemplary embodiment and the present invention contemplates other arrangements and architectures associated with network elements as are known in the art. For example, the network element 100 may include a single device configured to provide ingress/egress and switching as well as other distributed arrangements.

Figure 2:
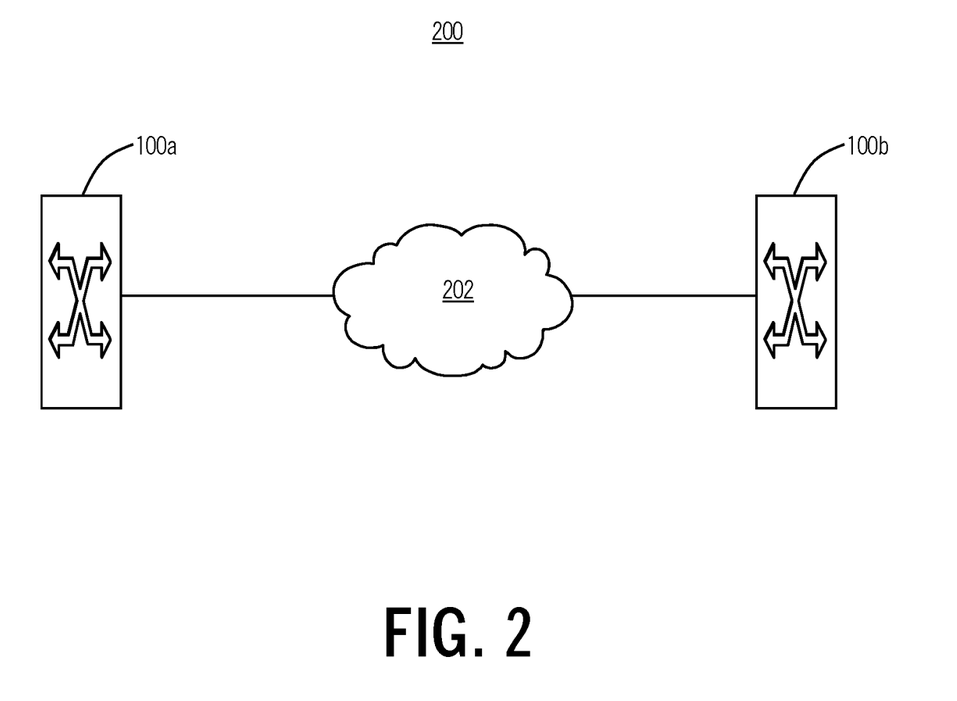
FIG. 2 is a diagram of a network highlighting network elements configured to synchronize therebetween based upon OTN delay measurements.

Referring to FIG. 2, in an exemplary embodiment, a diagram illustrates a network 200 highlighting network elements 100a, 100b configured to synchronize therebetween based upon OTN delay measurements. The network elements 100a, 100b are configured to operate using Optical Transport Network (OTN) and may be interconnected via intermediate network elements 100 (not shown), DWDM components (amplifiers, regenerators, optical add/drop multiplexers (OADM), etc.) represented by a cloud 202. The network 200 may include various architectures including, but not limited to, linear, rings, mesh, etc., and various protection schemes including, but not limited to, 1+1, 1:1, 1:N, 0:1, bi-directional line switched ring (BLSR), unidirectional path switched ring (UPSR), mesh, etc. A practical embodiment of the network 200 may have any number of network elements 100, each supporting any number of clients. The topology and configuration of the network 200 can vary to suit the needs of the particular application, and FIG. 2 is not intended to limit the application or scope of the subject matter in any way. Each of the network elements 100a, 100b may include various components such as described in FIG. 1. In general, the network elements 100a, 100b receives an input data stream from an external network connection, the network elements 100a, 100b perform processing, framing, etc. related to OTN.

In an exemplary embodiment, the present invention includes two interconnected network elements 100, such as the network elements 100a, 100b, and utilizes a Delay Measurement over OTN between the interconnected network elements 100 to provide a Delay Measurement with microsecond accuracy. Further, in an exemplary embodiment, the network elements 100a, 100b are configured to switch packets therebetween. For example, the network elements 100a, 100b may include the switch modules 106 with dual functionality providing OTN switching and packet switching. Results of the Delay Measurement over OTN may be provided to the packet switching components of the network elements 100a, 100b. By using the OTN Delay Measurement to synchronize, the network elements 100a, 100b, the packet delay, packet jitter, and packet throughput measurements between the network elements 100a, 100b are significantly more accurate than the current synchronization methods of GPS and NTP synchronization.

Figure 3:
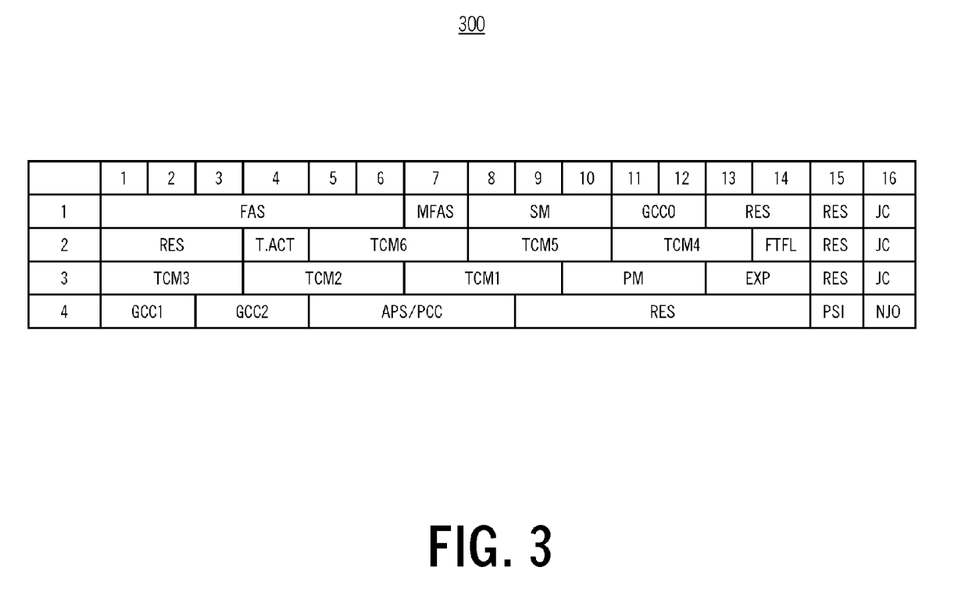
FIG. 3 is a diagram of G.709 overhead.

Referring to FIG. 3, in an exemplary embodiment, G.709 overhead 300 is partitioned into Optical channel Transport Unit (OTU) frame alignment bytes in row 1, columns 1-7; Optical channel Data Unit (ODU) overhead bytes in rows 2-4, columns 1-14; OTU overhead bytes in row 1, columns 8-14; and Optical channel Payload Unit (OPU) overhead in rows 1-4, columns 15-16. Further, the G.709 overhead 300 includes Forward Error Correction (FEC) data (not shown) in the frame. The OTU frame alignment bytes include a frame alignment signal (FAS) bytes and a multi-frame alignment signal (MFAS). Also, the G.709 overhead 300 includes section monitoring (SM) bytes and path monitoring (PM) bytes to provide optical layer error management between optical section and path in G.709. The SM bytes include dedicated BIP-8 monitoring to cover the payload signal. The first byte of the SM used for Trail Trace Identifier (TTI) which is a 64-byte character string similar to a section trace in SONET. The PM bytes include dedicated BIP-8 monitoring to cover the payload signal. The first byte of the PM is used for TTI which is similar to path trace in SONET. A general communication channel 0 (GCC0) bytes provide a communications channel between adjacent G.709 nodes. The G.709 overhead 300 further includes a payload signal identifier (PSI), justification control (JC), and negative justification opportunity (NJO). For asynchronous clients such as 10 GbE and 10G FC, NJO and PJO are used as stuff bytes similar to PDH. If the client rate is lower than OPU rate, then extra stuffing bytes may be inserted to fill out the OPU. Similarly, if the incoming signal is slightly higher than the OPU rate, NJO and PJO bytes may be replaced with signal information, i.e. the OPU payload capacity is increased slightly to accommodate the extra traffic on the pluggable transceiver, and the JC bytes reflect whether NJO and PJO are data or stuff bytes the JC bytes are used at the off-ramp to correctly de-map the signal. The PSI provides an identification of the payload signal. Further, the G.709 overhead 300 also includes six levels of Tandem Connection Monitoring (TCMn).

At the OTN level, the network elements 100a, 100b may be configured to perform Delay Measurements via the G.709 overhead 300. Specifically, the network elements 100a, 100b may perform a delay measurement of an ODUk path (DMp) or a delay measurement at a particular Tandem Connection (DMti). The delay measurement of an ODUk path is performed via the PM overhead and the delay measurement at a particular Tandem Connection is performed via the TCMn overhead. For ODUk path monitoring, a one-bit path delay measurement (DMp) signal is defined to convey the start of the delay measurement test. The DMp signal includes a constant value (0 or 1) that is inverted at the beginning of a two-way delay measurement test. The transition from 0 to 1 in the sequence . . . 0000011111 . . . , or the transition from 1 to 0 in the sequence . . . 1111100000 . . . represents the path delay measurement start point. The new value of the DMp signal is maintained until the start of the next delay measurement test. This DMp signal is inserted by the DMp originating Path-Connection Monitoring End Point (P-CMEP) and sent to the far-end P-CMEP, e.g. from the network element 100a to the network element 100b. This far-end P-CMEP loops back the DMp signal towards the originating P-CMEP. The originating P-CMEP measures the number of frame periods between the moment the DMp signal value is inverted and the moment this inverted DMp signal value is received back from the far-end P-CMEP. The receiver should apply a persistency check on the received DMp signal to be tolerant for bit errors emulating the start of delay measurement indication. The additional frames that are used for such persistency checking should not be added to the delay frame count. The looping P-CMEP should loop back each received DMp bit within approximately 100 µs. The ODUk tandem connection monitoring utilizes the same procedure as the delay measurement of an ODUk path except a DMti signal is between an originating Tandem Connection-Connection Monitoring End Point (TC-CMEP) and a far-end TC-CMEP. The path and the TCM delay measurements can be performed on-demand, to provide the momentary two-way transfer delay status, and pro-active, to provide 15-minute and 24-hour two-way transfer delay performance management snapshots. Of note, these delay measurements are defined in ITU-T G.709 (December 2009) and G.798 (October 2010), both of which are incorporated by reference in full herein.

Figure 4:
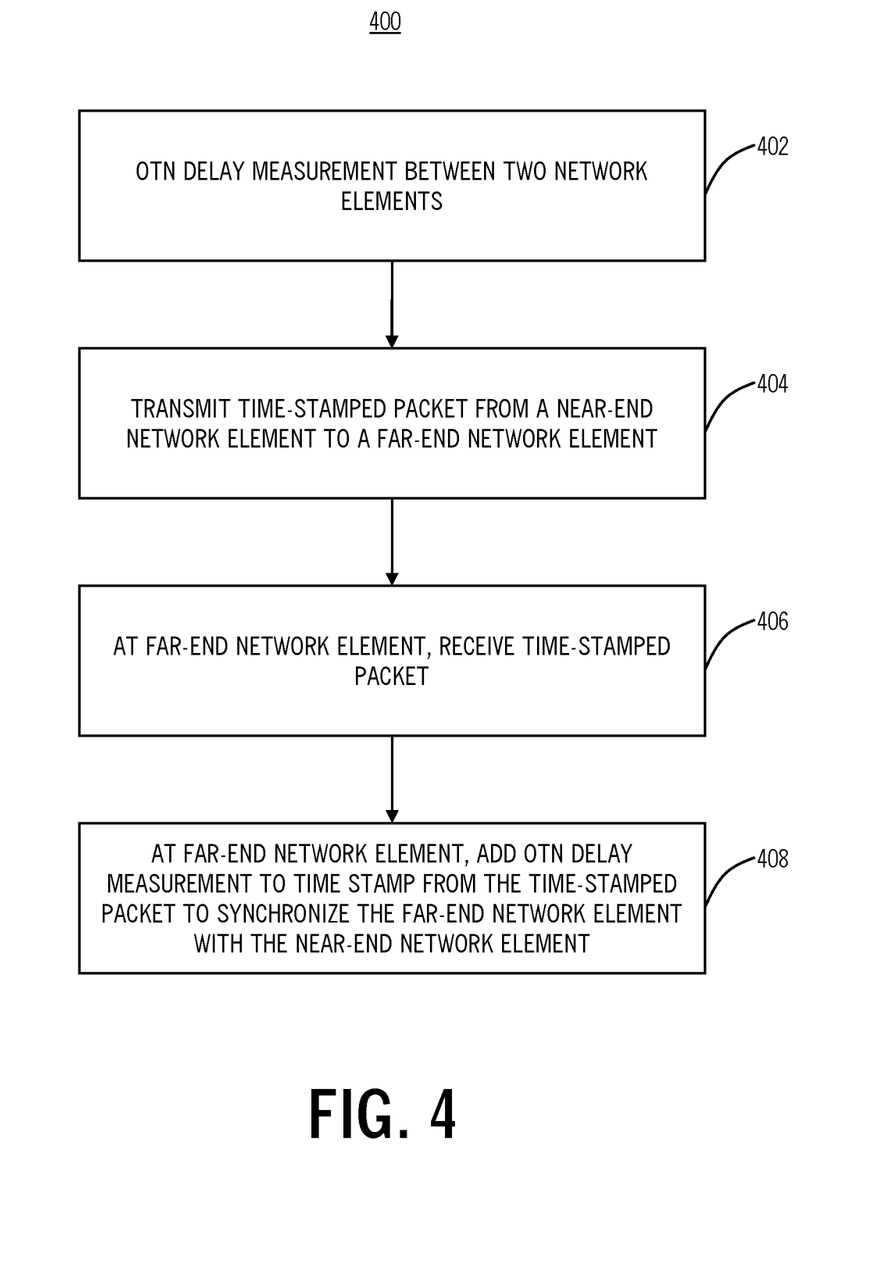
FIG. 4 is a flowchart of a packet synchronization method between two network elements.

Referring to FIG. 4, in an exemplary embodiment, a flowchart illustrates a packet synchronization method 400 between the network elements 100a, 100b. The packet synchronization method 400 may be implemented between any two network elements 100 in a network, and is performed between a near-end network element and a far-end network element. The near-end network element is the network element originating or requesting the synchronization such that the far-end network element's clock is synchronized with the near-end network element's clock. The packet synchronization method 400 can be repeated to synchronize network element clocks across a packet path or across the entire network. First, two network elements, i.e. the near-end network element and the far-end network element, perform an OTN Delay Measurement therebetween (step 402). Upon completion of the OTN Delay Measurement, each of the network elements will have a measurement that represents the OTN delay therebetween. This measurement provides the network elements with an equal delay measurement with an accuracy of better than 2.336 microseconds at the ODU4 rate. This accuracy is determined as 2 times the frame period. The following table illustrates the frame period required by the ITU-T G.709 standard, that is OTN Frame Rates (ITU-T, G.709, Table 7-4):

| OTU/ODU/OPU type | Period |
| --- | --- |
| ODU0/OPU0 | 98.354 μs |
| OTU1/ODU1/OPU1/OPU1-Xv | 48.971 μs |
| OTU2/ODU2/OPU2/OPU2-Xv | 12.191 μs |
| OTU3/ODU3/OPU3/OPU3-Xv | 3.035 μs |
| OTU4/ODU4/OPU4 | 1.168 μs |
| ODU2e/OPU2e | 11.767 μs |
| ODUflex/OPUflex | CBR client signals: 121856/client_signal_bit_rate GFP-F mapped client signals: 122368/ODUflex_bit_rate |

Note:
The period is an approximated value, rounded to 3 decimal places

Following OTN Delay Measurement, the near-end network element initiating the synchronization transmits a time-stamped packet to the far-end network element (step 404). The far-end network element receives the time-stamped packet (step 406) and recovers the time stamp in the packet. In an exemplary embodiment, the near-end network element and the far-end network element utilize OTN to transmit packets therebetween, such as, for example Gigabit Ethernet (GbE), 10 GbE, etc. To synchronize the far-end network element with the near-end network element, the far-end network element adds the measured OTN delay measurement to the time stamp synchronize the far-end network element clock with the near-end network element clock (step 408).

The packet synchronization method 400 can be automatically or manually implemented at the near-end network element via any mechanism including, but not limited to, NMS/EMS request, user request, automatic upon circuit provisioning, at periodic intervals, etc. The OTN delay measurements can also be taken on segments of the network using ODUk TCM layers. That is, the OTN delay measurements do not need to be between the two network elements, but may be a combination of TCM layers added together. The ODUk TCM can be used to tunnel through intermediate network elements, thereby providing a path across the network to perform the OTN delay measurement. The network elements can also perform one-way packet delay measurements, packet jitter measurements, and packet loss measurements as defined by the Internet Engineering Task Force (IETF) Request for Comments (RFC) standards. The Packet Delay Measurement, Packet Jitter Measurement, and Packet Throughput Measurement are described in the IETF RFC 2679 and RFC 2680 respectively Since the network element clocks can be synchronized to within 2.336 microseconds at the ODU4 rate, the packet delay measurement error using the packet synchronization method 400 is significantly lower than the current GPS or NTP synchronization methods. As described herein, the synchronization accuracy of the packet synchronization method 400 is inversely proportional to the line rate of the ODUk between the two network elements. The OTN delay measurement functions by counting the received frames between the beginning and ending of the measurement. The OTN frames period is based on the frame rate; therefore the clock synchronization accuracy is based on the OTN rate on which the measurement was taken. OTN is a bidirectional protocol, however the timing of the transmit and receive directions are independent. The difference in the frame position of the two directions can lead to a latency of up to one frame period at the far-end interface and one frame period at the near-end interface while performing the OTN delay measurement. This leads to an OTN delay measurement accuracy within two frame periods, or less than 2.336 microseconds at the ODU4 rate.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method, comprising:
utilizing Optical Transport Network (OTN) to perform an OTN delay measurement associated with a path between a first network element and a second network element via one or more of a delay measurement of an Optical Channel Data Unit-k (ODUk) path, a delay measurement at a tandem connection, and a delay measurement at a combination of tandem connections;
transmitting a time-stamped packet from the first network element to the second network element;
receiving the time-stamped packet at the second network element;
recovering a time stamp from the time-stamped packet to determine a packet delay measurement separate from the OTN delay measurement; and
utilizing the packet delay measurement and the OTN delay measurement to adjust the second network element, wherein the first network element and the second network element each support converged packet switching and OTN transport, wherein each of the first network element and the second network element perform the packet delay measurement and the OTN delay measurement such that each of the measurements is performed by a same set of network elements, and wherein the Optical Transport Network delay measurement is added to the time stamp from the packet delay measurement to adjust the second network element to within microsecond accuracy of the first network element.

2. The method of claim 1, further comprising:
utilizing the packet delay measurement and the Optical Transport Network delay measurement to adjust a clock of the second network element to synchronize with a clock of the first network element.

3. The method of claim 1, further comprising:
operating a packet service over Optical Transport Network between the first network element and the second network element.

4. The method of claim 1, wherein:
the first network element and the second network element are connected through a plurality of intermediate network elements.

5. The method of claim 4, further comprising:
operating a packet service over Optical Transport Network between the first network element and the second network element.

6. The method of claim 5, further comprising:
synchronizing each of the plurality of intermediate network elements with the first network element.

7. The method of claim 6, wherein the synchronizing comprises for each of the plurality of intermediate network elements:
utilizing Optical Transport Network to perform a delay measurement between the first network element and one of the plurality of intermediate network elements;
transmitting a time-stamped packet from the first network element to the one of the plurality of intermediate network elements;
receiving the time-stamped packet at the one of the plurality of intermediate network elements;
recovering a time stamp from the time-stamped packet; and
utilizing the time stamp and the delay measurement to adjust the one of the plurality of intermediate network elements.

8. The method of claim 4, further comprising:
performing the Optical Transport Network delay measurement through Path Monitoring (PM) bytes in Optical Transport Network.

9. The method of claim 4, further comprising:
performing the Optical Transport Network delay measurement through one or more Tandem Connection Monitoring (TCM) bytes in Optical Transport Network.

10. The method of claim 1, further comprising:
performing the Optical Transport Network delay measurement in Optical Transport Network compliant to G.709 and G.798.

11. The method of claim 1, wherein the first network element and the second network element do not utilize Global Positioning Satellite or Network Time Protocol for synchronization there between.

12. A network, comprising:
a plurality of interconnected network elements;
a packet service operating over Optical Transport Network (OTN) between a first network element and a second network element; and
a processor executing an algorithm configured to synchronize a clock associated with the second network element with a clock associated with the first network element based upon a delay measurement over OTN and a delay measurement over the packet service, wherein the delay measurement over OTN comprises one or more of a delay measurement of an Optical Channel Data Unit-k (ODUk) path, a delay measurement at a tandem connection, and a delay measurement at a combination of tandem connections, and wherein the delay measurement over OTN is added to a time stamp in the delay measurement over the packet service at the second network element to adjust the second network element to within microsecond accuracy of the first network element;
wherein the first network element and the second network element each utilize converged packet switching and OTN transport, and wherein each of the first network element and the second network element perform the packet delay measurement and the OTN delay measurement such that each of the measurements is performed by a same set of network elements.

13. The network of claim 12, wherein the algorithm comprises utilizing an Optical Transport Network delay measurement between the first network element and the second network element followed by a packet delay measurement between the first network element and the second network element.

14. The network of claim 13, wherein the algorithm comprises the second network element adjusting the clock associated with the second network element based upon the delay measurement over Optical Transport Network and the packet delay measurement.

15. The network of claim 13, wherein the first network element and the second network element are interconnected via a plurality of intermediate network elements.

16. The network of claim 15, wherein the algorithm utilizes Path Monitoring (PM) bytes in Optical Transport Network for the delay measurement over Optical Transport Network.

17. The network of claim 15, wherein the algorithm utilizes one or more Tandem Connection Monitoring (TCM) bytes in Optical Transport Network for the delay measurement over Optical Transport Network.

18. A network element, comprising:
a plurality of ports;
a switch interconnecting the plurality of ports, wherein the switch supports packet switching and Optical Transport Network (OTN) switching;
a clock; and
a processor executing an algorithm configured to synchronize the clock with an external network element based upon an OTN delay measurement and a packet delay measurement between one of the plurality of ports and the external network element, wherein the OTN delay measurement comprises one or more of a delay measurement of an Optical Channel Data Unit-k (ODUk) path, a delay measurement at a tandem connection, and a delay measurement at a combination of tandem connections, wherein the OTN delay measurement is added to a time stamp in the packet delay measurement to synchronize the clock to within microsecond accuracy of the first network element, and wherein the network element is configured to perform converged packet switching and OTN transport and the OTN delay measurement and the packet delay measurement are each performed by the switch such that each of the measurements is performed by a same set of network elements comprising the network element and the external network element.

19. The network element of claim 18, wherein the plurality of ports utilize Optical Transport Network compliant to G.709 and G.798, and wherein the one of the plurality of ports supports a packet service with the external network element.

20. The network element of claim 18, wherein the switch is a dual functionality switch and results from the OTN delay measurement are provided to packet switching components of the network element to adjust the packet delay measurement.

* * * * *